(12) United States Patent
Ferrer et al.

(10) Patent No.: US 8,297,230 B2
(45) Date of Patent: Oct. 30, 2012

(54) APPARATUS, SYSTEM, AND METHOD FOR ISOLATING AND VENTING A LITTER BOX

(76) Inventors: Jicky Ferrer, Mililani, HI (US); Marla Ferrer, Mililani, HI (US)

( * ) Notice: Subject to any disclaimer, the term of this patent is extended or adjusted under 35 U.S.C. 154(b) by 201 days.

(21) Appl. No.: 12/628,954

(22) Filed: Dec. 1, 2009

(65) Prior Publication Data

US 2010/0132624 A1   Jun. 3, 2010

Related U.S. Application Data

(60) Provisional application No. 61/118,976, filed on Dec. 1, 2008.

(51) Int. Cl.
*A01K 1/00* (2006.01)
(52) U.S. Cl. ......................... 119/165; 119/500
(58) Field of Classification Search .................. 119/161, 119/163, 165, 471–419, 500
See application file for complete search history.

(56) References Cited

U.S. PATENT DOCUMENTS

| | | | |
|---|---|---|---|
| 4,095,559 A | 6/1978 | Griffith | |
| 4,546,727 A * | 10/1985 | Andersen | 119/165 |
| 4,862,831 A * | 9/1989 | Graham | 119/419 |
| 5,044,325 A | 9/1991 | Miksitz | |
| 5,134,972 A | 8/1992 | Compagnucci | |
| 5,140,948 A | 8/1992 | Roberts | |
| D331,649 S | 12/1992 | Saja | |
| 5,307,761 A | 5/1994 | Berger, III et al. | |
| 5,315,964 A | 5/1994 | Mimms et al. | |
| 5,564,364 A | 10/1996 | Kovacs et al. | |
| 5,592,900 A * | 1/1997 | Kakuta | 119/164 |
| 5,655,478 A | 8/1997 | Kiera | |
| 5,738,040 A | 4/1998 | Simmons | |
| 5,806,461 A | 9/1998 | Kiera | |
| 5,842,438 A | 12/1998 | Messmer | |
| 6,119,408 A * | 9/2000 | Page | 52/2.23 |
| 6,123,048 A | 9/2000 | Alkire et al. | |
| 6,176,201 B1 * | 1/2001 | Fields | 119/165 |
| 6,227,147 B1 | 5/2001 | Ball | |
| 6,237,534 B1 | 5/2001 | Schwartz | |
| 6,341,579 B1 | 1/2002 | Alkire et al. | |

(Continued)

OTHER PUBLICATIONS

PCT/US2009/066285, International Search Report and Written Opinion, Jun. 14, 2010.

*Primary Examiner* — Timothy D Collins
*Assistant Examiner* — Brian M O'Hara
(74) *Attorney, Agent, or Firm* — Kunzler Law Group

(57) ABSTRACT

An apparatus, system, and method are disclosed for isolating and venting a litter box. The apparatus includes an enclosure for a litter box, an access door and a pet door in the enclosure, at least one vent between an interior and an exterior of the enclosure, and an exit duct between the interior and the exterior of the enclosure. The system includes a pet enclosure having an enclosure door, a pet door, at least one vent, and at least one exhaust duct, a litter box adapted for placement in the enclosure, a motor and fan in fluid communication with the exit duct, and a conduit from the exit duct adapted for fluid connection to an exterior of a house. The method includes enclosing a litter box in a pet container, drawing outside air through at least one vent in the pet container into an interior of the pet container and exhausting air from the pet container out through an exit duct.

18 Claims, 12 Drawing Sheets

U.S. PATENT DOCUMENTS

| | | |
|---|---|---|
| 2001/0047768 A1 | 12/2001 | Markowitz |
| 2002/0127966 A1 | 9/2002 | Rich |
| 2004/0094097 A1 | 5/2004 | Shartell |
| 2005/0133196 A1* | 6/2005 | Gagnon et al. ............. 165/54 |
| 2006/0156993 A1 | 7/2006 | Wright |
| 2007/0125308 A1 | 6/2007 | Goldston |
| 2007/0289542 A1 | 12/2007 | Wright |
| 2008/0087229 A1* | 4/2008 | Gabriel et al. ............. 119/417 |
| 2011/0048330 A1* | 3/2011 | Mathews ............. 119/165 |

* cited by examiner

APPARATUS, SYSTEM, AND METHOD FOR ISOLATING AND VENTING A LITTER BOX

CROSS-REFERENCES TO RELATED APPLICATIONS

This application claims priority to, U.S. Provisional Patent Application No. 61/118,976 entitled "APPARATUS, SYSTEM, AND METHOD FOR ISOLATING AND VENTING A LITTER BOX" and filed on Dec. 1, 2008 for Jicky Ferrer and Marla Ferrer, which is incorporated herein by reference.

TECHNICAL FIELD

This disclosure relates generally to pet care and more particularly relates to isolating and removing odors from a litter box and surrounding areas.

BACKGROUND

Description of the Related Art

Pet owners having household cats know all too well the odor associated with keeping their beloved animals inside. A large source of odor is the litter box that contains and pet waste. Great effort has been made to minimize the effort of cleaning the litter box of accumulated pet waste. Further, the litter itself is specially formulated to minimize odor and effort of cleaning pet waste. Many automated, self cleaning pet litter boxes are available to consumers. However, both the manual and automated pet litter boxes still suffer from the odor of pet waste escaping into the surrounding environment. As any pet owner will vouch, there is nothing worse than the wafting of pet waste odors throughout the house.

SUMMARY

From the foregoing discussion, it should be apparent that a need exists for an apparatus, system, and method that isolates and ventilates a pet litter box. The present disclosure has been developed in response to the present state of the art, and in particular, in response to the problems and needs in the art that have not yet been fully solved by currently available devices. Accordingly, the present disclosure has been developed to provide an apparatus, system, and method that overcome many or all of the above-discussed shortcomings in the art.

The apparatus is provided with a an enclosure for a litter box, an access door and a pet door in the enclosure, at least one vent between an interior and an exterior of the enclosure, and an exit duct between the interior and the exterior of the enclosure. The apparatus also includes a fan coupled in fluid communication with the exit duct, the fan configured to draw air out of the interior, and wherein the access door is a first door forming a first sealed closure on the enclosure when the access door is closed.

In one embodiment, the apparatus includes an opening in the first door and a sealed second closure covering the opening when the pet door is closed, and a filter in overlying relation on the vent to filter air passing through the vent. The vent is a one-way vent configured to permit passage of air from the exterior to an interior and to inhibit passage of air from the interior to an exterior of the enclosure through the vent.

A system of the present disclosure is also presented which includes a pet enclosure having an enclosure door, a pet door, at least one vent, and at least one exhaust duct, and a litter box adapted for placement in the enclosure. The system also includes a motor and fan in fluid communication with the exit duct, and a conduit from the exit duct adapted for fluid connection to an exterior of a house.

In one embodiment, the pet door is formed within the enclosure door, and the enclosure door is sealed relative to the enclosure and the pet door is sealed relative to the enclosure door. In a further embodiment, the litter box is an automatically self-cleaning litter box. The system also includes a filter overlying the vent, and wherein the filter is a scent filtering filter. In a further embodiment, the vent is a one-way vent inhibiting movement of air from an interior of the enclosure out through the vent.

A method of the present disclosure is also presented. The method in the disclosed embodiments substantially includes the steps necessary to carry out the functions presented above with respect to the operation of the described apparatus and system. In one embodiment, the method includes enclosing a litter box in a pet container, drawing outside air through at least one vent in the pet container into an interior of the pet container, and exhausting air from the pet container out through an exit duct.

In one embodiment, enclosing, drawing, and exhausting comprise inhibiting odor from exiting the pet container and entering a house and removing the odor from within the pet container and exhausting the air to an exterior of the house. In another embodiment, inhibiting odor from exiting the pet container comprises placing a barrier filter on the vent between the interior of the pet container and the exterior of the pet container. The method also includes filtering a portion of the air escaping from the interior through the vent to an exterior of the pet container.

In one embodiment, enclosing the litter box in the pet container comprises enclosing an automatically self-cleaning litter box in the pet container, and enclosing the litter box comprises closing a pet container door and a pet door. The method also includes sealing the pet container door and the pet door against escape of odors through the doors by at least one of moving and allowing the doors to be moved into a closed condition.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Furthermore, the described features, structures, or characteristics of the disclosure may be combined in any suitable manner in one or more embodiments. In the following description, numerous specific details are provided, such as examples of user selections, particular structures, etc., to provide a thorough understanding of embodiments of the disclosure. The disclosure may be practiced without one or more of the specific details, or with other methods, components, materials, and so forth. In other instances, well-known structures, materials, or operations are not shown or described in detail to avoid obscuring aspects described in accordance with embodiments of the disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
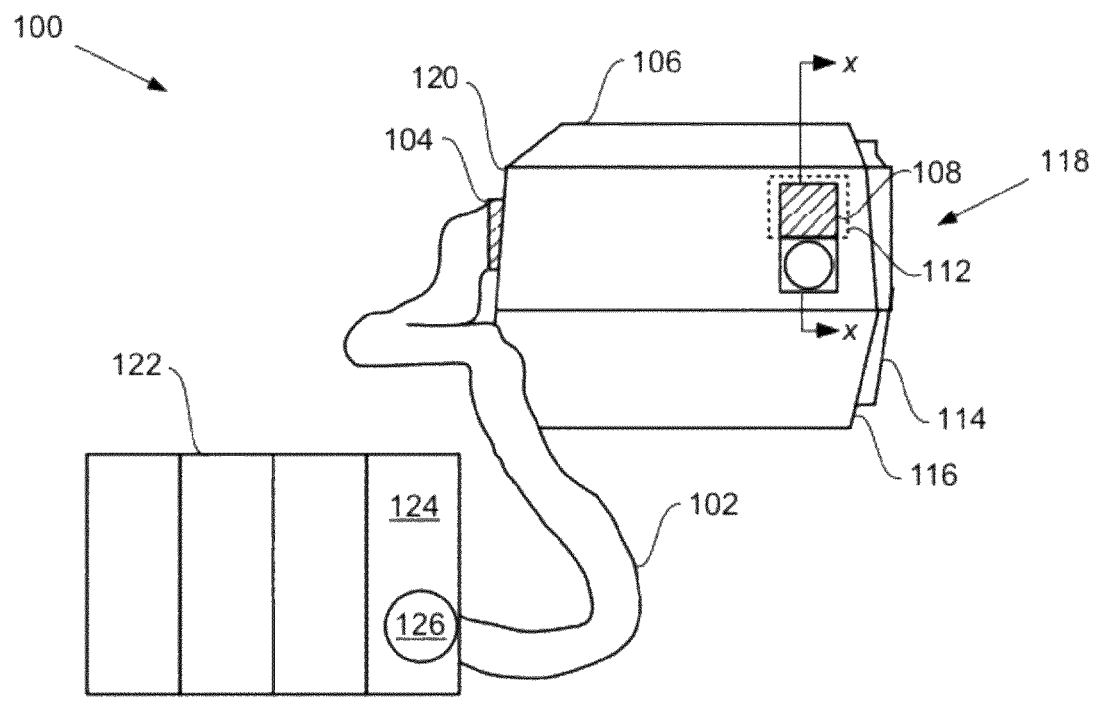
FIG. 1a is a side perspective view illustrating one embodiment of a litter box venting system.

FIG. 1A is a side perspective view illustrating one embodiment of a litter box venting system 100. The system 100 includes an exhaust conduit 102, a fan and motor unit 104 coupled with the exhaust conduit 104. The system 100 also includes a litter box enclosure 106. The litter box enclosure, in one embodiment, is a pet container with specific openings therein. For example, in one embodiment, the enclosure 106 has at least one vent 108 in a wall 110. The vent 108 may be formed of one or more opening(s) in any pattern or configuration. The vent 108 may have a filter 112 that covers and seals the opening(s).

The enclosure 106 also includes a flange 114 supported on and extending from a front wall 116 of the enclosure 106. The flange 114 defines an opening 118 for an access door as will be described in greater detail below. The flexible tube conduit 102 may be coupled to a back wall 120 of the enclosure 106. The flexible tube or exhaust conduit 102 may be coupled at a position opposite from the vent 108 in order to draw air across a major portion of the interior of the enclosure 106.

The exhaust conduit 102 extends from the enclosure 106 to a window 122. A window adapter 124 may be placed in a frame or sliding track of the window 122 once the window 122 has been opened. The window adapter 124 has an exit opening 126 for receiving an end of the exhaust conduit 102. The open window 122 can then be closed until it abuts an edge of the window adapter 124 so that the window can still remain substantially closed with the window adapter supported in a frame or track thereof. The window adapter 124 may be formed of sheet plastic or other material, and may be transparent or translucent to enable light to pass through the adapter 124. The opening 126 may be created by removing material from a pre-scored knock-out. The knock-out may be one of a plurality of knock-outs that are sized to match a corresponding plurality of conduit sizes so that a user may select and use any of a number of conduit sizes.

The fan and motor unit 104, in one embodiment, is coupled to the back wall 120 to produce a positive flow of air out of the interior of the enclosure 106 through the exhaust conduit 102. Alternatively, the fan and motor unit 104 may be placed on the distal end of the exhaust conduit 102, or formed integrally with the window adapter 124. This beneficially reduces motor noise inside the enclosure 106 which may startle an animal.

Figure 1B:
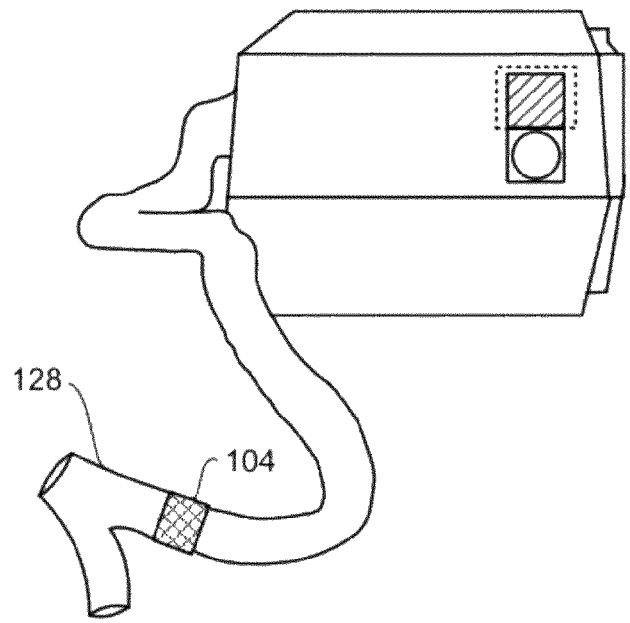
FIG. 1b is a side perspective view illustrating another embodiment of the litter box venting system.

FIG. 1b is a side perspective view illustrating another embodiment of the litter box venting system 100. In one embodiment, the exhaust conduit 102 includes a branched section formed by a double vent attachment 128 coupled to the distal end of the flexible conduit 102. The double vent attachment 128 is similar in operation to a "Y" drain fitting in that it combines the exhaust of two sources into one exhaust conduit. For example, the double vent attachment 128 may combine air from the enclosure 106 and from a clothes dryer. A flap or other one-way valve (not shown) may be placed at a junction between the second branch and the rest of the conduit in order to inhibit flow of air and odors toward the clothes dryer.

In one embodiment, as depicted in FIG. 1B, the fan and motor unit 104 may be located between the flexible conduit 102 and the double vent attachment 128. Placement of the fan and motor unit 128 at this position functions similarly to draw air through the enclosure and out the exhaust conduit. However, locating the fan and motor unit in spaced relation to the enclosure may have the benefit of reducing the chances of frightening pets.

Figure 2A:
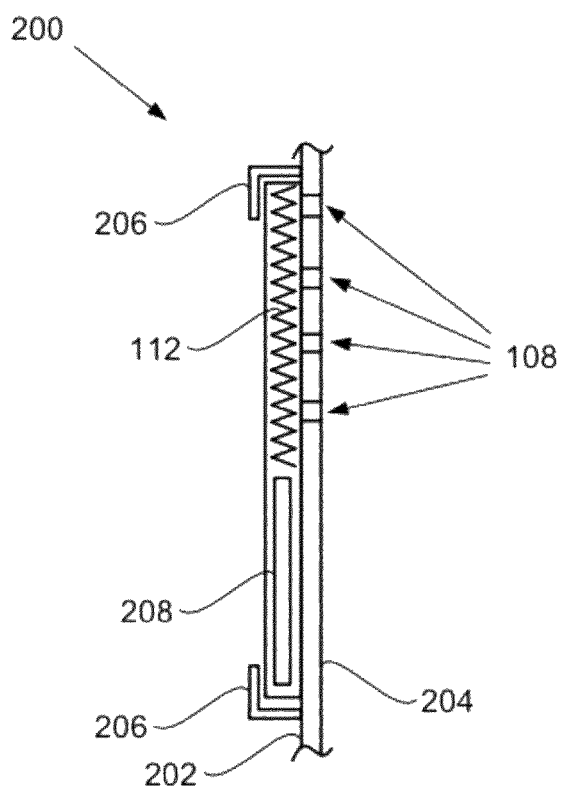
FIG. 2a is a block diagram illustrating a cross sectional view of the filter assembly taken.

FIG. 2a is a block diagram illustrating a cross sectional view of the filter assembly 200 taken along line x of FIG. 1A. The filter 112 may be on an interior surface 202 of the enclosure 106, or alternatively, coupled with an exterior surface 204 of the enclosure 106. The filter 112, in one embodiment, is held in place by a bracket 206 or other structure. The filter 112 may be made of any of one or more filtering materials including, without limitation, carbon, cellulose, melt blown polymeric fibers, paper, deodorizers, odor absorbers, etc.

The filter 112 inhibits odor, hair, and particles from passing out through the vent from an interior of the enclosure 106 to an exterior. The filters 112 may be high efficiency particulate air (HEPA) or other filters configured to catch dust, pet dander, and other airborne contaminants or irritants and inhibit their exit to the house through vent(s) 108. The material trapped by the filters 112 may include dust or other particles that collect on the pet's paws, and which may be rubbed off or otherwise removed inside the enclosure. Thus, the enclosure with its vents and filters has the advantage of reducing airborne and other particles that may adversely affect asthmatics and others with sensitive systems.

The filter 112 may also inhibit dust, lint, and other particles or material from entering the enclosure 106 through the vent 108. The filter 112 may have a deodorant or air freshener element 208 attached below the filter 112. The air freshener element 208 may be separate or may be integral with the filter 112 and replaceable as a unit with the filter 112.

Figure 2B:
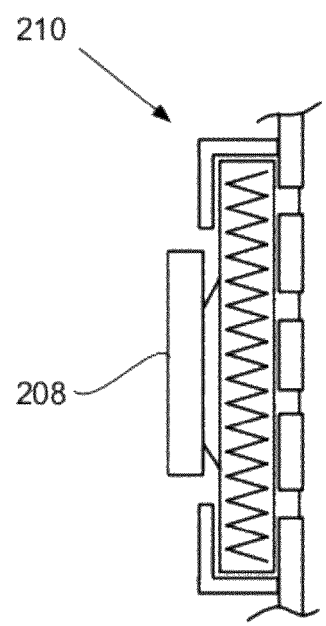
FIG. 2b is a block diagram illustrating a cross sectional view of an alternative embodiment of the filter assembly.

FIG. 2b is a block diagram illustrating a cross sectional view of an alternative embodiment of the filter assembly 210 taken along line x of FIG. 1a. In one embodiment, the deodorant element 208 may be aligned with the flow of air into or out of the enclosure 106. Alternatively, one or more other deodorant elements 208 may be placed at other locations separate from the filter 112.

Figure 2C:
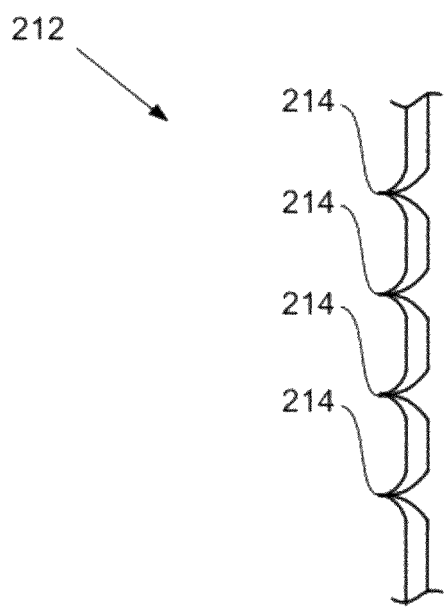
FIG. 2c is a cross sectional diagram illustrating one embodiment of a venting system.

FIG. 2c is a cross sectional diagram illustrating one embodiment of a venting system 212. The filter 112 and deodorant element 208 may be incorporated as with the embodiments of FIGS. 2a and 2b without limitation. FIG. 2c shows an alternative or additional embodiment of the vent 108 in which the openings have structure or characteristics that provide one-way flow. In the particular embodiment depicted, the openings are closed by duckbill or reed valves 214. Such valves may be formed of a flexible polymeric material that has thin flexible portions that meet in a bent, sealed, and abutting relationship that inhibits flow of fluid in a direction opposite the bend. On the other hand, fluid having a minor amount of pressure is permitted to flow past the flexible portions in the same direction of the bend.

In one embodiment, air is permitted to enter the enclosure 106 through the vent 108 and inhibited from leaving through the vent 108. The pressure needed to open the valves 214 may be supplied by the fan and motor unit 104 of FIGS. 1a and 1b. It is to be understood that the openings may be short slits, or elongated slots. Further alternatively, the vent may be provided by one or more louvers that are biased into a closed condition by a spring and mechanical linkage to create the one-way valve. The louver(s) may have seals that inhibit escape of air therethrough when in a closed condition. Still further alternatively, the louver(s) could be mechanically and/or electrically actuated at the time of venting air through the enclosure 106. In a further embodiment, the filter 112 itself may include structure or flow properties that inhibit flow in a direction toward an exterior while allowing air to flow inwardly for passage of ventilating air through the vent 108 into the interior of the enclosure 106.

Figure 3:
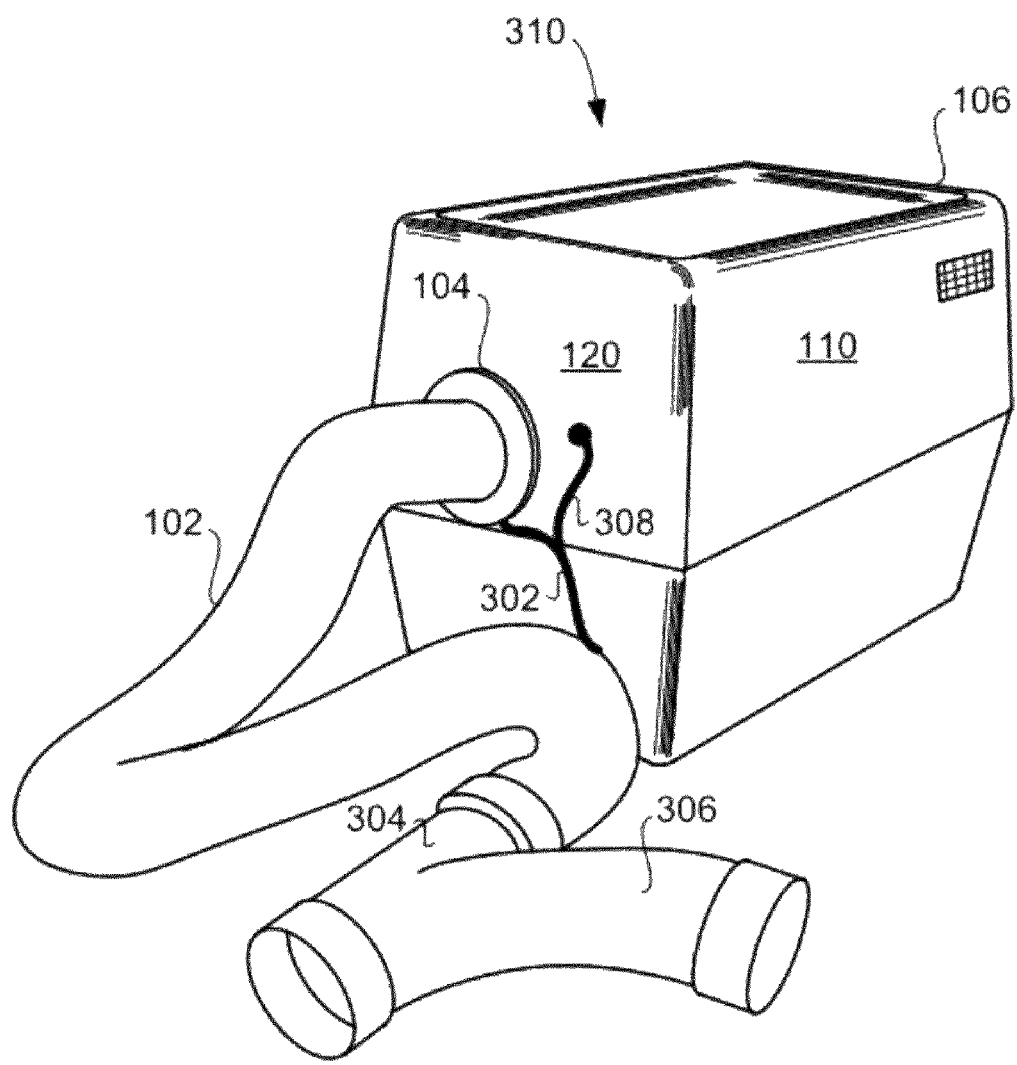
FIG. 3 is a rear perspective view illustrating one embodiment of the litter box enclosure.

FIG. 3 is a rear perspective view illustrating one embodiment of the litter box enclosure 106 of FIGS. 1A and 1B. As described with regard to FIGS. 1A and 1B, the pet litter box enclosure 106 has the side wall 110, the back wall 120, and the conduit 102 coupled to the back wall 120. The conduit 102 may be coupled to the back wall 120 by a fan and motor unit 104 in an exit duct through the back wall 120. As shown, the conduit 102 is connected in fluid communication with the fan and motor unit 104, and the fan and motor unit 104 is coupled to the back wall 120 in fluid communication with the interior of the enclosure 106. An electric fan cord 302 may be connected to a power supply to run the motor and draw air from within the enclosure 106. The air is moved into the conduit 102 and out through the first branch 304 to an outside environment external to a house in which the enclosure is being used. Thus, the air may be moved from the interior of the enclosure 106 and/or from a dryer, for example, through the first and second branches 304, 306, respectively, and out of the house without the air and associated odors escaping.

An additional electrical and/or sensor cord 308 may extend through the side or back wall, or a seam in the side wall into the interior of the enclosure 106 to power an automatically self-cleaning litter box such as the LitterMaid™, for example, and/or other accessories. In one embodiment, the fan and motor unit 104 runs continuously so that air is always being drawn through the enclosure 106 into the enclosure through the vents 108 and any other openings. In this way, any odor within the enclosure is exhausted and is not permitted to flow out of the vents and/or openings into the house.

In other embodiments, any number, variety, and combination of sensors, detectors, and switches may be incorporated into the enclosure 106 and/or the litter box to detect a proper timing for running the fan and motor unit 104 and/or other accessories. It is to be understood that the sensors and detectors may include at least one of a sensor and a timer connected with the litter box for detecting and actuating the fan in response to at least one of a motion, presence of a pet, exit of a pet, presence of moisture, presence of an odor, change in weight, and change in temperature. The fan and motor unit 104 may be a very quiet unit or may be placed at an opposite end of the conduit 102 to pull air through the conduit instead of push, as with the configuration shown in the embodiment of FIG. 3.

The enclosure 106, in one embodiment, is formed with a recessed portion 310 on a top surface of the enclosure 106. The recessed portion 310 is formed having sidewalls sufficient to maintain pet supplies. For example, the recessed portion 310 may be used to store water and food bowls for a pet, such as a cat or small dog. The cat can easily access the recessed portion 310 to eat and drink. The recessed portion 310 maintains any food or water that may be spilled. In a further embodiment, the recessed portion 310 may be formed having integral food and water serving areas.

Figure 4A:
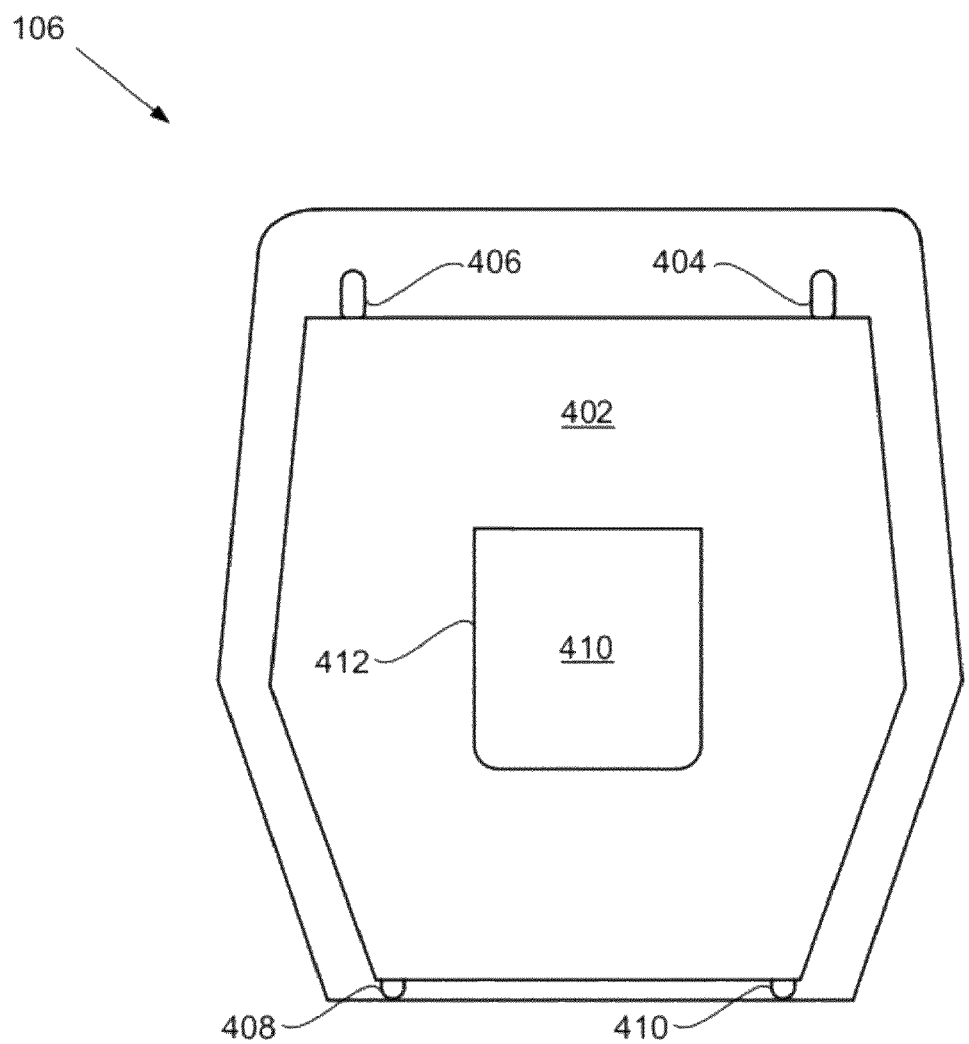
FIG. 4a is a diagram illustrating a front view of the enclosure having an enclosure door.

FIG. 4a is a diagram illustrating a front view of the enclosure 106 of FIGS. 1a-1b having an enclosure door 402. The enclosure door 402, in one embodiment, covers an opening at least partially defined by the flange shown in FIGS. 1a-1b. The enclosure 106 includes lock hubs 404, 406, 408, 410 to facilitate access to an interior of the enclosure 106. The lock hubs 404, 406, 408, 410 are placed at four respective corners of the enclosure door 402.

A frame 412 may outline a pet door opening 414 through the enclosure door 402. A swinging or flexible pet door 414 may be disposed in the opening to fill and close off the opening defined by the frame 412. For example, the pet door may be formed of a flexible plastic or rubber material that complementarily engages inner surfaces of the frame 412 to create a seal that inhibits passage of gases and odors carried by the gases through the pet door opening when it is closed. A pet may approach the pet door 414 and enter or exit by gently pressing past the pet door 414 through the pet door opening. A user may access an interior of the enclosure 106 by reaching through the pet door opening and engaging rods or bolts to unlatch or unlock the enclosure door 402. In this way, the door 402 may be removed. Alternatively, the enclosure 402 may be coupled to the enclosure 106 in such a manner as to enable the removal of the door 402 without reaching into the interior of the enclosure 106.

Figure 4B:
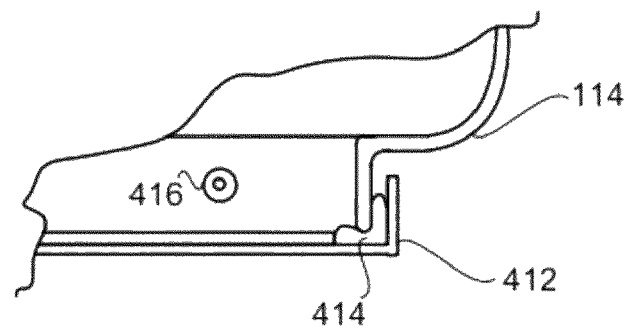
FIG. 4b is a diagram illustrating a cross sectional view of the interaction between the door and the enclosure.

FIG. 4b is a diagram illustrating a cross sectional view of the interaction between the door 402 and the enclosure 106. Thus, FIG. 4b shows a complementary door flange 412 that has a configuration that closely surrounds the flange 114 of FIG. 1a, and may be sealed relative to the flange 114 by a gasket 414 to inhibit escape of gases and odors carried by the gases through a space between the door 402 and the flange 114 on the front wall. The gasket 414 may be formed of any flexible material that resists flow of gases. For example, the gasket 414 may be formed of rubber or flexible plastic material and may be adhered to an inner surface of the enclosure door 402.

Bolts or rods 416 may slide within the hubs 404, 406, 408, 410 and engage respective receivers on the flange 114 of the enclosure 106. The rods 416, in one embodiment, have springs that bias them into the receivers in mating relationship and enable selectively releasing the rods 416 from the receivers for removing the enclosure door 402, or the rods 416 may be inserted when it is desired to close and seal the enclosure door 402 relative to the enclosure 106.

Figure 5:
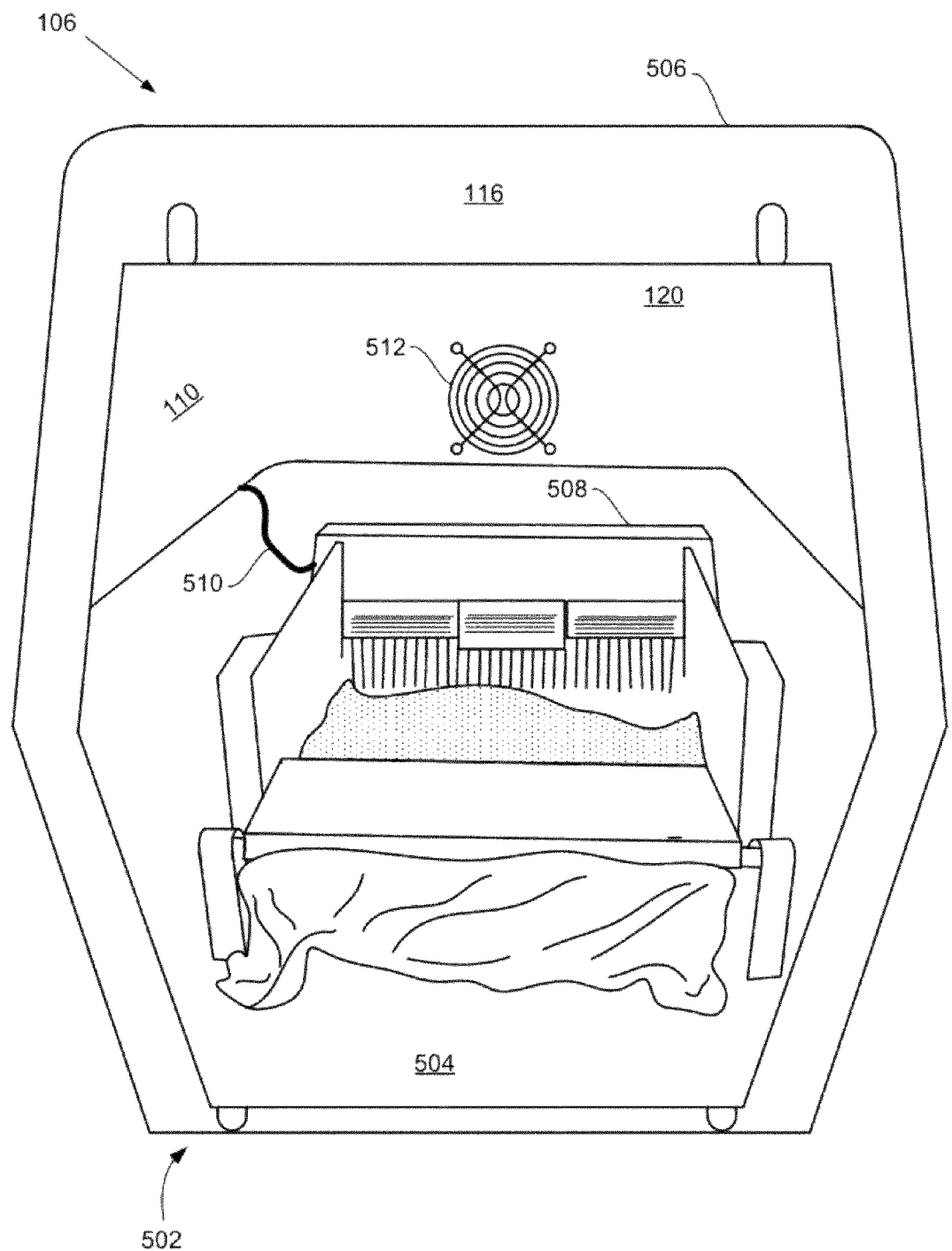
FIG. 5 is a front perspective diagram illustrating one embodiment of the interior of the enclosure.

FIG. 5 is a front perspective diagram illustrating one embodiment of the interior of the enclosure 106 of FIGS. 1a and 1b. Thus, an interior 502 of the side wall 110 and an interior of the back wall 120 are shown forming the interior of the enclosure 106 together with the front wall 116 a bottom wall 504 and a top wall 506. These walls are spaced in a configuration that enables placement of the automatically self-cleaning litter box 508, which is powered by the electrical cord 510. The back wall 120 has an exit duct 512 formed therethrough with a fan supported therein. The fan, in one embodiment, has a protective guard disposed over the exit duct.

A system that includes the automatically self-cleaning litter box 508 and the enclosure 106 enables isolation of odors and removal of the odors from the litter box 508 in addition to the benefits of the litter box 508 automatically cleaning the litter. Alternatively, the self-cleaning litter box 508 may be replaced by any litter box, which may or may not be automated and/or self-cleaning. Further alternatively, the litter box 508 may be replaced by an absorbent pad. The litter box(es) and absorbent pad(s) may be used in conjunction with embodiments of the present disclosure for cats, dogs, or any of a variety of pets that can be trained to use them.

Figure 6:
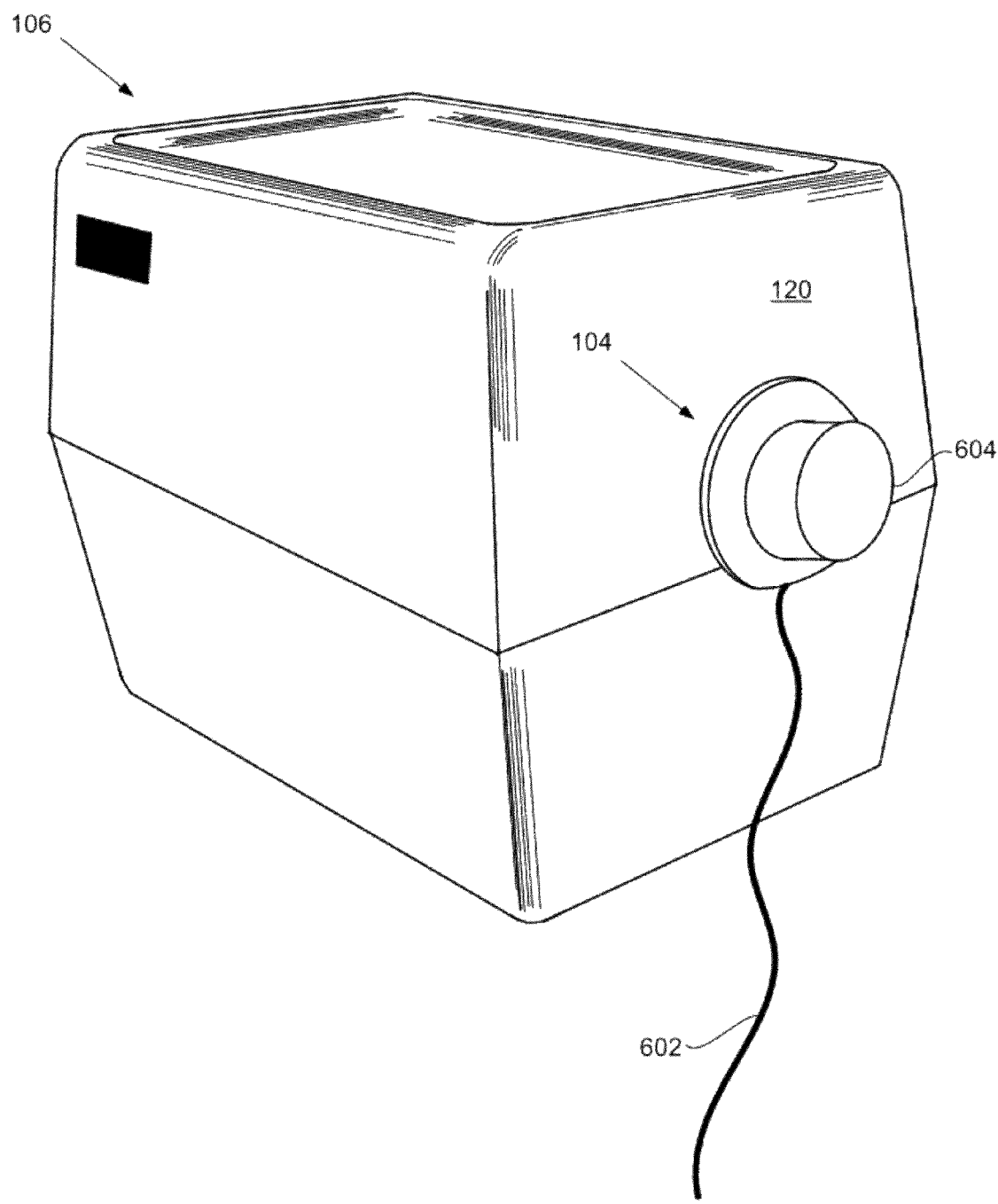
FIG. 6 is a rear perspective view diagram illustrating one embodiment of the litter box enclosure.

FIG. 6 is a rear perspective view diagram illustrating one embodiment of the litter box enclosure 106. In the depicted embodiment, the fan and motor unit 104 is attached to the back wall 37 by fasteners. The fan and motor unit 104 has the electrical cord 602 connected to it to supply power to the fan and motor unit 104. The fan and motor unit 104 has a conduit-coupling flange 604 for attachment of the flexible conduit 102.

Figure 7:
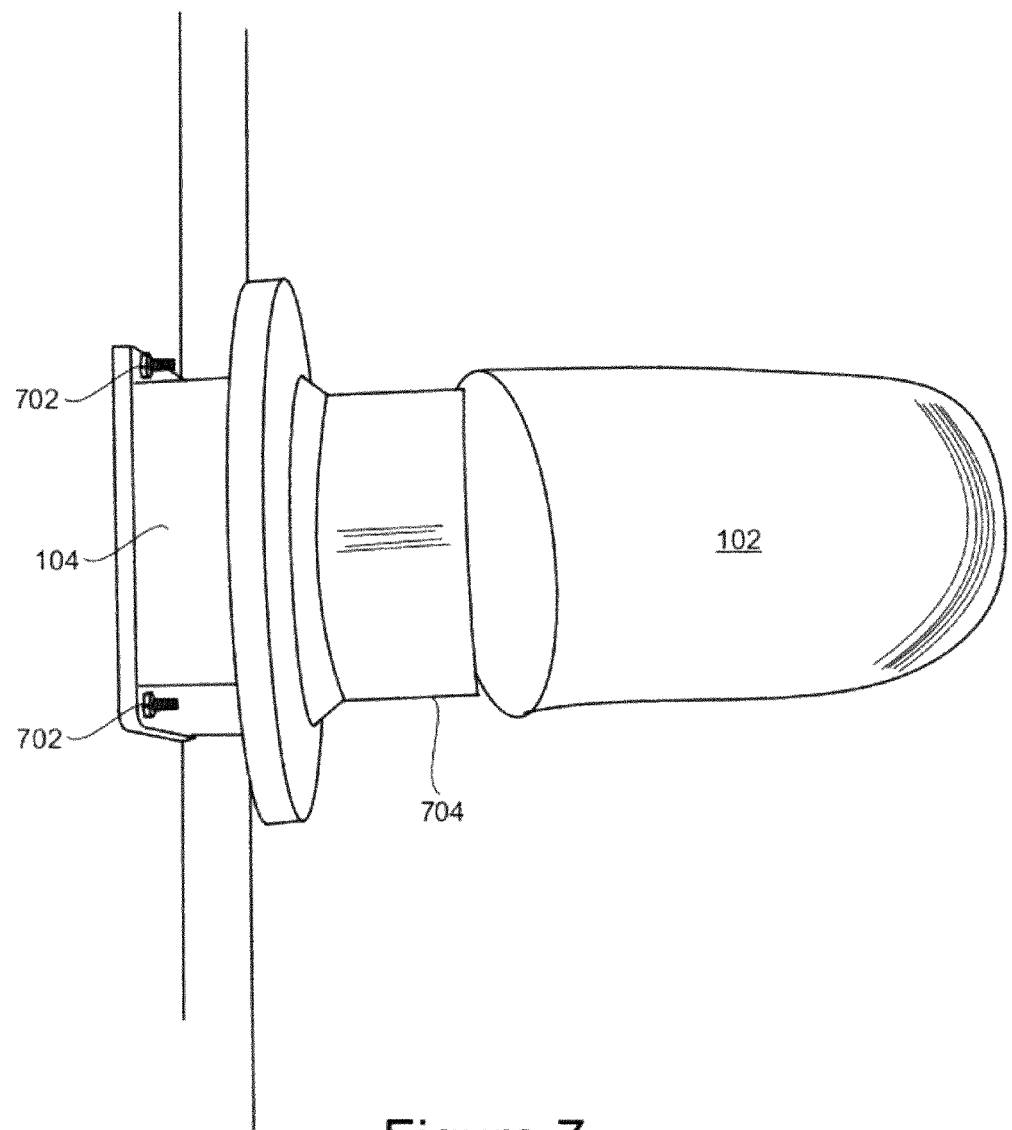
FIG. 7 is a side perspective view diagram illustrating one embodiment of the fan and motor unit supported in and extending from the exit duct in the back wall.

FIG. 7 is a side perspective view diagram illustrating one embodiment of the fan and motor unit 104 supported in and extending from the exit duct in the back wall 120. FIG. 7 shows the fan and motor unit 104 attached to the back wall 120 by a fastener 702. The conduit-coupling flange 704 is disposed for easy installment of the flexible tube conduit 102. Once the conduit has been slid over the conduit-coupling flange, the conduit 102 may be secured thereto by a clamp element such as a hose clamp (not shown) to inhibit any inadvertent leakage of gases and odors carried by the gases.

Figure 8A:
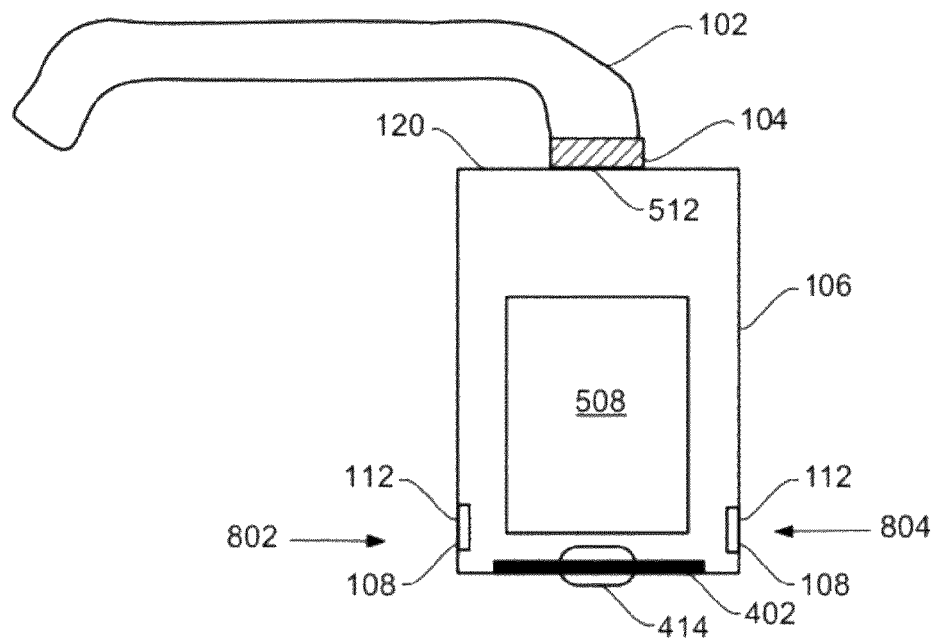
FIGS. 8A and 8B are diagrammatic top sectional views illustrating embodiments of the enclosure and the exhaust conduit.
Figure 8B:
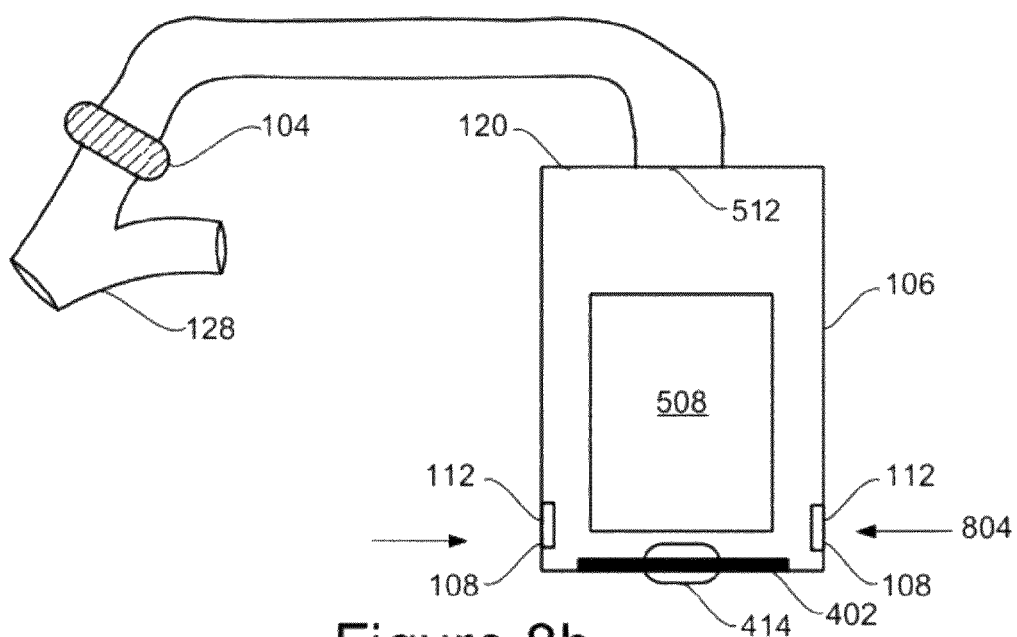

FIGS. 8A and 8B are diagrammatic top sectional views illustrating embodiments of the enclosure 106 and the exhaust conduit 102 with two distinct configurations for the placement of the fan and motor unit 104. FIGS. 8a and 8b also illustrate two distinct configurations for the placement of the end of the exhaust conduit. While shown in specific combinations, it is to be understood that the configurations may be combined in any manner. For example, the location of the fan and motor unit 104 in FIGS. 1b and 8b may be applied to the embodiments shown in FIGS. 1a and 8a by placing the fan and motor unit 104 at a junction generally near the window. In this case, a conduit-coupling flange may be attached directly to a back wall 120 of the enclosure 106.

Further alternatively, the fan and motor unit may be placed directly on an end of the exhaust conduit outside the house. In one embodiment, the double vent attachment 128 shown in FIG. 8b may be applied to the embodiment of FIG. 8a when, for example, the user wants to exhaust both of the air from the enclosure 106 and the air from a clothes dryer through a common outlet through a window. The motor and fan sizes and capacities may be selected to provide sufficient flow and pressure, including sufficient pressure to open any valves within the exhaust conduit 102 and double vent attachment 128.

In use, air is drawn into the enclosure 106 through the vent(s) 108 and/or filter(s) 112, as indicated by arrows 802 and 804. The air travels throughout the interior of the enclosure 106 and gathers odors or draws smelly air from within the enclosure along with it. The odors and smelly air may be present from pets having used the litter box 508. Because the enclosure is self-contained and otherwise sealed from external air, the odorous air inside is forced to move out through the exit duct 512, fan and motor unit 104, and into the conduit 102, as shown in FIG. 8a. The air thus carries any odors that have been picked up on its path or draws the smelly air along as it moves. The odors are carried out of the enclosure 13, and out of a house in which the enclosure is being used.

The embodiment of FIG. 8b shows the double vent attachment 128 connected to the conduit 102 and forming a branched conduit. This branched conduit is effective for channeling air from each of the enclosure 106 and another source through the first branch of the double vent attachment 128. Air from a clothes dryer may be transported through the second branch and out of the house at the same and/or at different times relative to removal of air from the enclosure 106. As shown in FIG. 8b, the fan and motor unit 104 may be located at a position in the branched conduit between the flexible conduit 102 and the double vent attachment 128 instead of on the back wall of the enclosure 106. The air is moved by the fan and motor unit 104 and is inhibited from leaving through other parts of the enclosure 106 by the substantially tight and/or sealed nature of the enclosure. In addition to having walls that are air tight or sealed, the enclosure door 402 and pet door 414 are also sealed in order to inhibit air and odors from escaping into the house. Rather, the odors are expelled through the conduit 102 and out through a dryer vent, (as with the embodiment shown in FIG. 8b), or through a window, (as with the embodiment of FIG. 8a), to an exterior of the house.

It is to be understood that one or more of the enclosure 106, flexible conduit 102, fan and motor unit 104, filter(s) 112, deodorizer(s), double vent attachment 128, window adapter 124, may be provided as a kit. As such, a kit may include both a window adapter 124 and a double vent attachment 128, and a user may select the combination of elements and the configuration that best fits the selected location and availability outlet access points to an exterior of the house.

Figure 9:
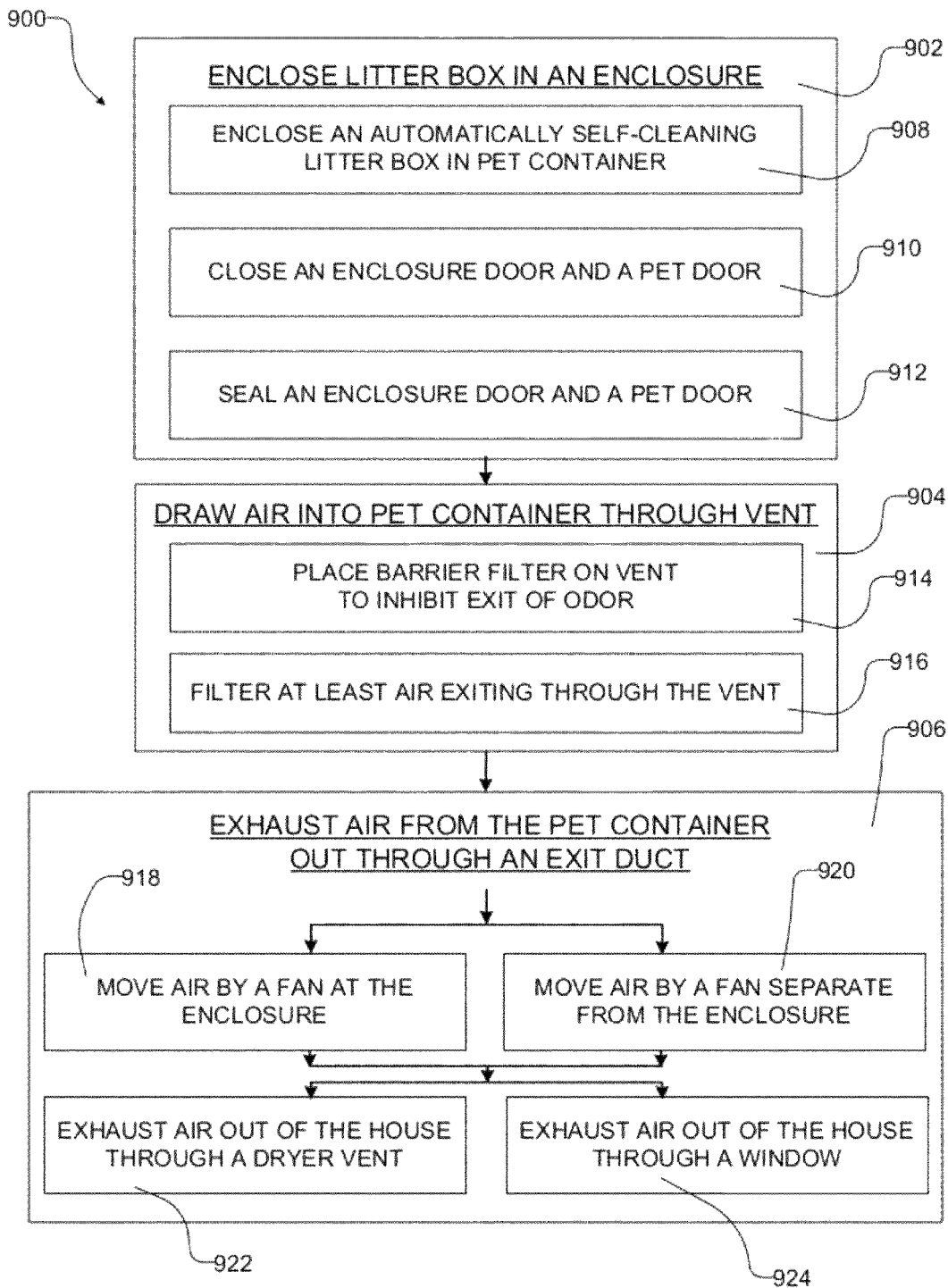
FIG. 9 is a schematic block diagram of a method for enclosing or isolating a litter box.

FIG. 9 is a schematic block diagram of a method 900 for enclosing or isolating a litter box, and for removing odors from the litter box in accordance with embodiments of the present disclosure. Operations include enclosing the litter box in a pet container 902, drawing air into the pet container through at least one vent in the pet container 904 into an interior of the pet container, and exhausting air from the pet container out through an exit duct 906. These operations may also include inhibiting odor from exiting the pet container and inhibiting the odor from entering a house. They may also include removing the odor from within the pet container and exhausting the air to an exterior of the house.

Referring to FIG. 9, the operation of enclosing the litter box may include enclosing an automatically self-cleaning litter box 908 in the pet container. Enclosing the litter box may include closing an enclosure door and a pet door 910. The method may also include substantially sealing an enclosure/pet container door and a pet door 912. The method may also include at least one of moving and allowing the doors to be moved into a closed condition sealed condition.

In one embodiment, the operation of drawing air through at least one vent includes inhibiting odor from exiting the pet container. Inhibiting the odor may also include placing a barrier filter on the vent between the interior of the pet container and the exterior of the pet container 914. In one embodiment, the operation of drawing air through the vent includes filtering at least a portion of air that escaping from the interior through at least one vent to an exterior of the pet container 916 into the house.

With regard to exhausting air from the pet container 906, the air may be moved by a fan located at the enclosure 118 such as being supported on the back wall as shown and described above. Alternatively, the air may be moved by a fan located separately from the enclosure 120 such as in an exhaust conduit. A user can select a location of the fan based on exterior access points from within the house and other factors. Other locations for the fan are also available for pushing or pulling the air through the enclosure.

Other options associated with the operation of exhausting air 906 include exhausting the air out of the house through a dryer vent 922 and exhausting the air out of the house through a window 924. Other options include creating a hole through an exterior wall of the house. A user may select from among these options acquire the needed components or utilize the associated components from a kit. Thus, the method includes any of a variety of user selections.

Figure 10:
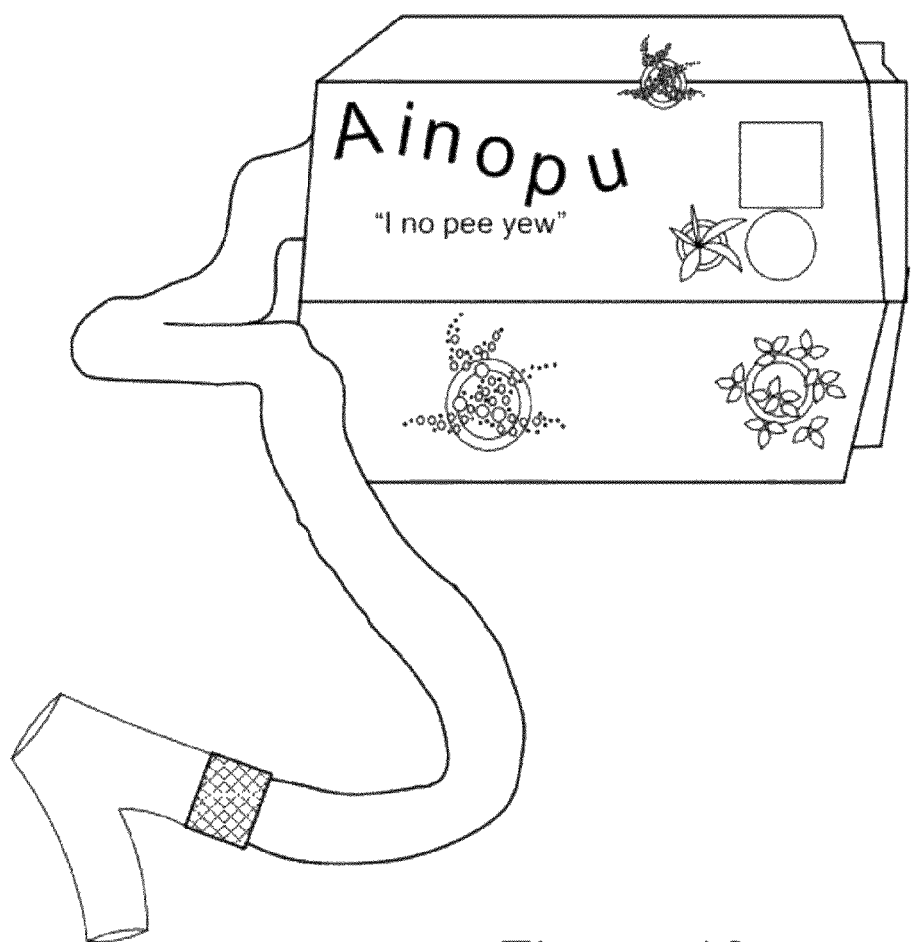
FIG. 10 is a side perspective view illustrating one embodiment of personalizing an enclosure.
Figure 11:
FIG. 11 is a side perspective view illustrating another embodiment of personalizing an enclosure.

Another user selection that may be implemented in conjunction with embodiments of the present disclosure includes a selection of a theme by a user, an example of which is shown in FIGS. 10 and 11. By way of explanation, a user may select from among a variety of themes such as a car racing theme, jungle theme, sports theme, etc. The user also may select one or more pets for which the enclosure is intended. A service to the user may include customizing a decoration on an exterior of the enclosure to include one or more theme(s). Also, the service may include customizing the décor to include photos or other images representing the user's selected pets. For example, a photograph of a pet may be inserted into a seat of a racecar and the theme and pet images may be disposed on an exterior surface of the enclosure. Alternatively, the jungle theme may be applied with a picture of the cat for which the enclosure is intended. With the jungle theme, a concept of bringing the out of doors inside is incorporated. Thus, the enclosure with its tropical décor represents the out of doors area to which the pet resorts when it needs to use the litter box.

Figure 12:
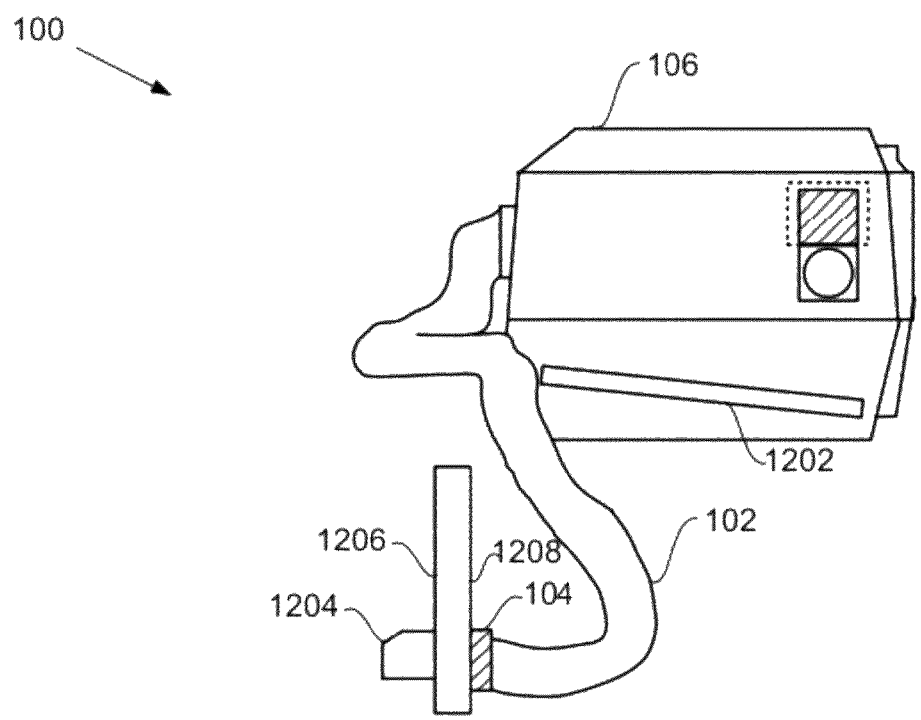
FIG. 12 is a side perspective view diagram illustrating another embodiment of the system.

FIG. 12 is a side perspective view diagram illustrating another embodiment of the system 100. In one embodiment, the enclosure 106 includes a sliding tray receptacle 1202 for catching spilled litter from the litter tray (not shown here). The tray receptacle 1202 beneficially catches spilled litter and other waste material and prevents the need to clean out the bottom surface of the enclosure 106. When the tray receptacle 1202 is full, the tray receptacle may slide out and be cleaned or replaced. In a further embodiment, the system 100 includes a fixed grill disposed between the floor of the enclosure 106 and the tray receptacle 1202. The fixed grill beneficially provides for air circulation under the litter box or absorbent puppy pad to inhibit sweating and speed the drying process. Also, the fixed grill allows for litter spill to be collected in the tray receptacle 1202. The tray receptacle 1202 may slide out and the clean litter returned to the litter box.

The system 100 also includes a vent hood 1204 that may include a one-way flap for preventing the ingress of air into the enclosure 106 through the conduit 102. The vent hood 1204 may be attached to an exterior wall of a house 1206. In such a configuration, the motor 104 may be coupled to an interior surface of a house 1208, as depicted, or alternatively, coupled to the enclosure 106 as shown in FIG. 1a.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system for isolating and removing odors and particulates from a pet waste receptacle, the system comprising:
    a pet enclosure having an enclosure door, a pet door, at least one vent, and at least one exit duct, the pet enclosure comprising an interior for receiving a pet waste receptacle within the enclosure, the pet waste receptacle comprising one or more of a litter box and an absorbent pad;
    a motor and fan in fluid communication with the exit duct;
    an exhaust conduit connected to the exit duct and configured to provide fluid communication between the exit duct and an exterior environment surrounding a human dwelling;
    a double vent attachment attached to the exhaust conduit and adapted to connect to a dryer vent, the double vent attachment comprising a first branch, a second branch, and a one-way valve for inhibiting air flow from the first branch to the second branch;
    wherein the at least one vent comprises a one-way air inlet valve mounted in a wall of the pet enclosure, wherein said one-way air inlet valve is in fluid communication with the interior of the pet enclosure and the environment immediately surrounding the pet enclosure configured for inhibiting movement of air from the interior out through the at least one vent; and wherein, except for the one-way air inlet valve and the exit duct, the interior is sealed from the environment immediately surrounding the pet enclosure when the enclosure door and pet door are both in a closed position.

2. The system of claim 1, wherein the enclosure door comprises a through opening and the pet door comprises a covering for the through opening when the pet door is in a closed position.

3. The system of claim 2, wherein the enclosure door is sealed relative to the enclosure when the enclosure door is in a closed position and the pet door is sealed relative to the enclosure door when the pet door is in the closed position.

4. The system of claim 1, wherein the pet waste receptacle comprises a litter box and the litter box is an automatically self-cleaning litter box.

5. The system of claim 1, further comprising a filter overlying the at least one vent.

6. The system of claim 1, wherein the filter is a scent filtering filter.

7. The system of claim 1, wherein the one-way air inlet valve comprises a flexible polymeric material.

8. The system of claim 1, wherein the one-way air inlet valve comprises one or more of a duckbill vale, a reed valve, and a louver.

9. The system of claim 1, further comprising an air freshener element disposed over the at least one vent.

10. The system of claim 1, wherein the pet enclosure comprises a floor and a grill above the floor.

11. The system of claim 1, further comprising a removable tray receptacle for catching waste material.

12. The system of claim 1, wherein the pet door is openable by a pet.

13. The system of claim 12 wherein the pet door allows a pet to enter or exit through the pet door by pressing on the pet door.

14. The system of claim 7, wherein the pet enclosure comprising a top surface and wherein the top surface comprises a recessed portion.

15. The system of claim 1, wherein the pet enclosure comprises an opening or seam adapted for allowing a power cord to run from an exterior of the pet enclosure to an interior of the pet enclosure.

16. A method for isolating and removing odors and particulates from a pet waste receptacle, the method comprising:
providing an apparatus comprising
a pet enclosure having an enclosure door, a pet door, at least one vent, and at least one exit duct, the enclosure door comprising a through opening and the pet door comprising a covering for the through opening when the pet door is in a closed position, the pet enclosure comprising an interior for receiving a pet waste receptacle within the enclosure, the pet waste receptacle comprising one or more of a litter box and an absorbent pad;
a motor and fan in fluid communication with the exit duct;
wherein the at least one vent comprises a one-way air inlet valve mounted in a wall of the pet enclosure, wherein said one-way air inlet valve is in fluid communication with the interior of the pet enclosure and the environment immediately surrounding the pet enclosure configured for inhibiting movement of air from the interior out through the at least one vent;
wherein, except for the one-way air inlet valve and the exit duct, the interior is sealed from the environment immediately surrounding the pet enclosure when the enclosure door and pet door are both in a closed position; and
providing an exhaust conduit adapted for providing fluid communication between the exit duct and an exterior environment surrounding a human dwelling;
providing the pet waste receptacle within the pet enclosure;
connecting the exhaust conduit to the exit duct and the double vent attachment;
connecting the exhaust conduit to provide fluid communication between the exit duct and an exterior environment surrounding a human dwelling;
running the motor and fan such that air is drawn in through the at least one vent and out through the double vent attachment to the exterior environment surrounding the human dwelling.

17. The method of claim 16 further comprising providing a double vent attachment adapted to connect to a dryer vent, the double vent attachment comprising a first branch, a second branch, and a one way valve for inhibiting air flow from the first branch to the second branch, wherein connecting the exhaust conduit comprises connecting the exhaust conduit to the first branch of the double vent attachment.

18. A kit for isolating and removing odors and particulates from a pet waste receptacle, the system comprising;
a pet enclosure having an enclosure door, a pet door, at least one vent, and at least one exit duct, the pet enclosure comprising an interior for receiving a pet waste receptacle within the enclosure, the pet waste receptacle comprising one or more of a litter box and an absorbent pad;
a motor and fan in fluid communication with the exit duct;
an exhaust conduit connected to the exit duct and configured to provide fluid communication between the exit duct and an exterior environment a human dwelling;
a double vent attachment attached to the exhaust conduit and adapted to connect to a dryer vent, the double vent attachment comprising a first branch, a second branch, and a one-way valve for inhibiting air flow from the first branch to the second branch;
wherein the at least one vent comprises a one-way air inlet valve mounted in a wall of the pet enclosure, wherein said one-way air inlet valve is in fluid communication with the interior of the pet enclosure and the environment immediately surrounding the pet enclosure configured for inhibiting movement of air from the interior out through the at least one vent; and
wherein, except for the one-way air inlet valve and the exit duct, the interior is sealed from the environment immediately surrounding the pet enclosure when the enclosure door and pet door are both in a closed position.

* * * * *

UNITED STATES PATENT AND TRADEMARK OFFICE
CERTIFICATE OF CORRECTION

PATENT NO. : 8,297,230 B2
APPLICATION NO. : 12/628954
DATED : October 30, 2012
INVENTOR(S) : Ferrer et al.

It is certified that error appears in the above-identified patent and that said Letters Patent is hereby corrected as shown below:

<u>Column 1, Line 25</u>
"contains and pet" ---should read "contains pet"

<u>Column 8, Line 32</u>
"both of the air" ---should read "both the air"

Signed and Sealed this
Twelfth Day of February, 2013

Teresa Stanek Rea
*Acting Director of the United States Patent and Trademark Office*